(12) United States Patent
Melucci et al.

(10) Patent No.: US 12,364,970 B2
(45) Date of Patent: Jul. 22, 2025

(54) METHOD FOR THE TREATMENT OF A POROUS SUBSTRATE

(71) Applicants: CONSIGLIO NAZIONALE DELLE RICERCHE, Rome (IT); MEDICA S.P.A., Medolla (IT)

(72) Inventors: Manuela Melucci, Rome (IT); Vincenzo Palermo, Rome (IT); Massimo Zambianchi, Rome (IT); Andrea Liscio, Rome (IT); Alessandro Kovtun, Rome (IT); Emanuele Treossi, Rome (IT); MariaLuisa Navacchia, Rome (IT); Letizia Bocchi, Rome (IT)

(73) Assignees: CONSIGLIO NAZIONALE DELLE RICERCHE, Rome (IT); MEDICA S.P.A., Medolla (IT)

( * ) Notice: Subject to any disclaimer, the term of this patent is extended or adjusted under 35 U.S.C. 154(b) by 933 days.

(21) Appl. No.: 17/292,596

(22) PCT Filed: Sep. 30, 2019

(86) PCT No.: PCT/IB2019/058300
§ 371 (c)(1),
(2) Date: May 10, 2021

(87) PCT Pub. No.: WO2020/099954
PCT Pub. Date: May 22, 2020

(65) Prior Publication Data
US 2021/0402374 A1     Dec. 30, 2021

(30) Foreign Application Priority Data
Nov. 16, 2018    (IT) ........................ 102018000010402

(51) Int. Cl.
   *B01J 20/30*      (2006.01)
   *B01J 20/28*      (2006.01)
   (Continued)

(52) U.S. Cl.
CPC ..... *B01J 20/3078* (2013.01); *B01J 20/28023* (2013.01); *B01J 20/28038* (2013.01);
(Continued)

(58) Field of Classification Search
None
See application file for complete search history.

(56) References Cited

U.S. PATENT DOCUMENTS

2018/0141006 A1    5/2018   Van Gestel et al.
2018/0147542 A1*   5/2018   Jhon ................. B01D 67/0093

FOREIGN PATENT DOCUMENTS

| JP | 61107909 A | * | 5/1986 |
| JP | 61200806 A | * | 9/1986 |
| WO | 2018183609 A1 | | 10/2018 |

OTHER PUBLICATIONS

Goh et al ("Graphene oxide as effective selective barriers on a hollow fiber membrane for water treatment process", J Membrane Sci 474 (2015)244-253). (Year: 2015).*

(Continued)

*Primary Examiner* — Michael Forrest
(74) *Attorney, Agent, or Firm* — Dorsey & Whitney LLP

(57) ABSTRACT

A method for the treatment of a substrate; the substrate comprises hollow fibre membranes, each of which has a side wall, comprising a base material, and an inner lumen, which is delimited by the side wall; the base material comprises a polysulfone or a derivative thereof; the substrate is placed in contact with graphene oxide in the presence of a liquid so as to obtain an intermediate compound, from which the liquid is at least partially removed and which is thermally treated so that the graphene oxide is at least partially fixed to the substrate and a treated material is obtained comprising treated fibres.

17 Claims, 7 Drawing Sheets

(51) Int. Cl.
*B01J 20/32* (2006.01)
*C02F 1/28* (2023.01)

(52) U.S. Cl.
CPC .......... *B01J 20/3212* (2013.01); *C02F 1/283* (2013.01); *C02F 1/285* (2013.01); *C02F 1/288* (2013.01); *C02F 2305/00* (2013.01)

(56) References Cited

OTHER PUBLICATIONS

Machine Translation for Awata JP 61107909A (Year: 2024).*
Machine Translation for Hasegawa JP-61200806 (Year: 2024).*
Zambianchi et al ("Graphene oxide doped polysulfone membrane adsorbers for the removal of organic contaminants from water", Chem Eng. J. 326 (2017), 130-140). (Year: 2017).*
Park et al ("Thin-film composite hollow fiber membranes incorporated with graphene oxide in polyethersulfone support layers for enhanced osmotic power density", Desalination. vol. 464, (2019), pp. 63-75) (Year: 2019).*

International Search Report and Written Opinion from International Application No. PCT/IB2019/058300 mailed Dec. 20, 2019.
Badrinezhad, et al., "Preparation and charaterization of polysulfone/graphene oxide nanocomposite membranes for the separation of methylene blue from water", Polym. Bull., vol. 75, May 2, 2017, pp. 469-484.
Chen, et al., "Graphene Oxide-Reinforced Hollow Fiber Solid-Phase Microextraction Coupled with High-Performance Liquid Chromatography for the Determination of Cephalosporins in Milk Samples", Food Anal. Methods, vol. 9, No. 9, Feb. 9, 2016, pp. 2452-2462.
Lou, et al., "Simultaneous determination of 11 phthalate esters in bottled beverages by graphene oxide coated hollow fiber membrane extraction coupled with supercritical fluid chromatography", Analytica Chimica Acta, vol. 1007, May 1, 2018, pp. 71-79.
Zhang, et al., "Polyethersulfone enwrapped graphene oxide porous particles for water treatment", Chemical Engineering Journal, vol. 215-216, Jan. 1, 2013, pp. 72-81.
Zhou, et al., "Ultrathin graphene oxide-based hollow fiber membranes with brush-like CO2-philic agent for highly efficient CO2 capture", Nature Communications, vol. 8, No. 1, Dec. 1, 2017, pp. 1-8.

* cited by examiner

METHOD FOR THE TREATMENT OF A POROUS SUBSTRATE

CROSS-REFERENCE TO RELATED APPLICATIONS

This patent application is a U.S. National Stage Application of PCT International No. PCT/IB2019/058300 filed on 30 Sep. 2019, which claims priority from Italian Patent Application No. 102018000010402 filed on 16 Nov. 2018, the entire disclosure of each of which is herein incorporated by reference.

TECHNICAL FIELD

The present invention relates to a method for the treatment of a substrate, a treated material and uses thereof.

BACKGROUND TO THE INVENTION

In the field of purification of fluids, membranes and fibres made of different polymeric materials are used. Despite the numerous ongoing efforts to prepare new filters able to improve the separation between different components, there is a continuing need to identify materials able to selectively separate some substances (the separation of some polluting substances is still considered not satisfactory).

Membranes have been proposed having chemically modified surfaces or variable compositions.

However, modifications of the membranes often alter (also negatively) the intrinsic properties and filtering and/or adsorption performances. Furthermore, the intimate mixture of several materials (so as to obtain composite materials) modifies the morphology of the starting material, changing (often negatively) its adsorption properties.

Many of the materials proposed so far are particularly difficult and costly to produce and/or are not sufficiently resistant and durable.

In particular, the patent application with publication number WO2018/183609 describes a method for the treatment of hollow fibres by means of graphene oxide. However, this method does not allow sufficiently strong binding of the graphene oxide to the hollow fibre.

The object of the present invention is to provide a method for the treatment of a substrate, a treated material and uses thereof, which enable the drawbacks of the known art to be overcome, at least partially, and are, at the same time, easy and inexpensive to implement.

SUMMARY

According to the present invention, a method for the treatment of a substrate, a treated material and uses thereof are provided as claimed in the following independent claims and, preferably, in any one of the claims depending directly or indirectly on the independent claims.

BRIEF DESCRIPTION OF THE FIGURES

The invention will be described below with reference to the attached figures, which illustrate some non-limiting embodiment examples thereof, in which.

DETAILED DISCLOSURE

Figure 2:
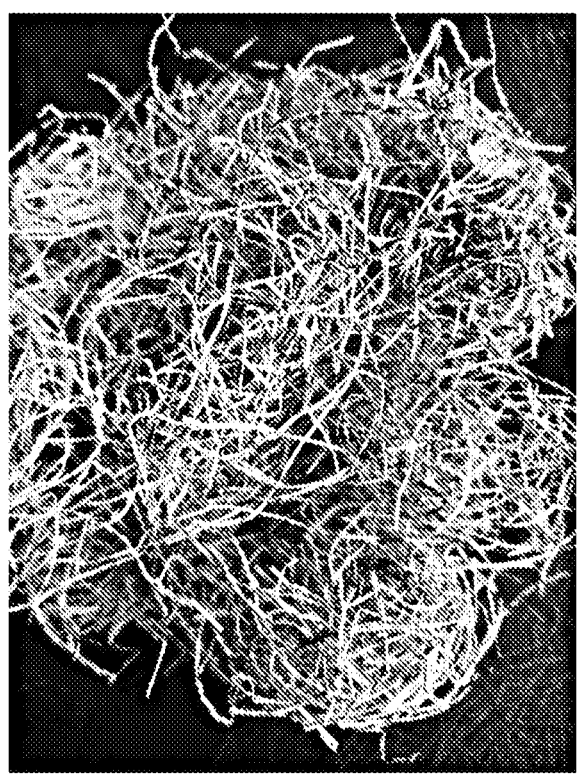
FIG. 2 is a photograph of a substrate (non-treated hollow fibre) that can be used in a method according to the present invention.

In accordance with a first aspect of the present invention, a method is provided for the treatment of a substrate (FIG. 2); the substrate comprises hollow fibre membranes, each of which has a side wall, comprising (consisting of) a base material, and an inner lumen, which is delimited by the side wall (the structure of the hollow fibre membranes is shown by way of example in photograph 11).

The side wall (is porous and) has an outer surface provided with pores having diameter ranging from approximately 0.1 µm to approximately 15 µm and an inner surface (which delimits the cited inner lumen) provided with pores having diameter ranging from approximately 5 nm to approximately 200 nm; the base material is selected from the group consisting of: polysulfone, polyethersulfone, derivatives thereof (and a combination thereof).

The method comprises: a combination step, during which the substrate is combined (in particular placed in contact) with graphene oxide so as to obtain an intermediate compound; during the combination step, the substrate and the graphene oxide are combined with each other in a first liquid; a removal step, which is (at least partially) subsequent to the combination step and during which (at least) part of the first liquid is removed (the first liquid is removed) from the intermediate compound; and a fixing step, during which the intermediate compound is thermally treated so that the graphene oxide is fixed (at least partially) to the substrate and a treated material is obtained comprising treated hollow fibre membranes.

In other words, during the fixing step, the intermediate compound is thermally treated so that at least part of the graphene oxide binds in a substantially fixed manner with the substrate and a treated material is obtained comprising treated hollow fibre membranes.

The treated material has shown excellent capacity for absorption (in particular, adsorption) of a mixture of organic pollutants (caffeine CAF, ofloxacin OFLOX, benzophenone 3 BP3, benzophenone 3 BP4, Carbamazepine CBZ, Bisphenol A BPA, Rhodamine Rh and diclofenac DCF).

It has been experimentally observed that the treated material surprisingly showed much higher absorption (in particular, adsorption) qualities (compared to analogous materials in the state of the art) for CAF, OFLOX and DCF.

Furthermore, the method used for preparation of the treated material proved to be simple and quick, not requiring, for example, coextrusion of the different components and/or dissolving of one component and re-precipitation in the presence of the other.

The method used also allows the inner structure of the material not to be substantially altered, thus maintaining its intrinsic properties unchanged.

In particular, the diameter of the pores is measured by means of SEM. More precisely, the dimension in one direction (taken at random) is measured.

Advantageously but not necessarily, the first liquid contains (consists of) water (and/or ethanol). In particular, the ethanol has a weight ranging from approximately 50% (more in particular, from approximately 70%; even more in particular, from approximately 90%) to approximately 150% (more in particular, to approximately 130%; even more in particular, to approximately 110%) of the weight of the water. Alternatively or additionally, the first liquid comprises from approximately 30% (in particular, from approximately 40%) to approximately 70% (in particular, to approximately 60%) by weight of ethanol, relative to the overall weight of the liquid.

Alternatively or additionally, the first liquid comprises from approximately 30% (in particular, from approximately 40%) to approximately 70% (in particular, 60%) by weight of water, relative to the overall weight of the liquid.

In particular, during the fixing step, the graphene oxide is fixed at least partially to a surface of the substrate, in particular to the inner surface and/or to the outer surface (more in particular, on the outer surface) of the hollow fibre membranes.

Advantageously but not necessarily, during the removal step, the cited at least part of the first liquid is removed by means of evaporation.

According to some advantageous but non-limiting embodiments, during the removal step, the intermediate compound is treated at a temperature lower than approximately 55° C. (in particular, higher than approximately 20° C.; more in particular, higher than approximately 30° C.)

In particular, during the removal step the intermediate compound is treated at a pressure lower than the atmospheric pressure (in particular, lower than approximately 100 bar; more in particular, higher than approximately 25 mbar).

Advantageously but not necessarily, at the end of the removal step (before the fixing step), the intermediate compound has up to approximately 500% (in particular, up to 400%; more in particular, up to 300%) by weight relative to the overall weight of the hollow fibre membranes prior to the combination step.

Advantageously but not necessarily, at the end of the removal step (prior to the fixing step), the intermediate compound has at least approximately 150% (in particular, at least 200%; more in particular, 205%) by weight relative to the overall weight of the hollow fibre membranes prior to the combination step.

In particular, at the end of the combination step (prior to the removal step), the intermediate compound has at least approximately 10 times (more in particular, up to approximately 40 times) the overall weight of the hollow fibre membranes prior to the combination step.

According to some non-limiting embodiments, the fixing step is (at least partially) subsequent to the removal step.

In particular, the fixing step is carried out when at least part of the first liquid has been removed from the intermediate compound. In other words, the fixing step is carried out when the quantity (percentage by weight relative to the overall weight of the intermediate compound) of the first liquid in the intermediate compound has reduced.

In particular, the intermediate compound prior to the (beginning of the) fixing has a quantity (percentage by weight relative to the overall weight of the intermediate compound) of the first liquid lower than the quantity (percentage by weight relative to the overall weight of the intermediate compound) of the first liquid of the intermediate compound prior to the (beginning of the) fixing step.

Advantageously but not necessarily, at the end of the fixing step, the treated material has at least approximately 75% (in particular, at least approximately 80%; more in particular, at least approximately 90%; even more in particular, at least approximately 100%) by weight, relative to the overall weight of the hollow fibre membranes prior to the combination step.

More precisely but not necessarily, the treated material has up to approximately 125% (in particular, up to approximately 110%; more in particular, up to approximately 105%) by weight, relative to the overall weight of the hollow fibre membranes prior to the combination step.

Advantageously but not necessarily, during the fixing step, the intermediate compound undergoes a treatment selected from a group consisting of: treatment by means of microwaves, treatment by means of heating and a combination thereof. The treatment by means of microwaves entails treating the intermediate compound with microwaves. The treatment by means of heating entails treating the intermediate compound in an oven.

Advantageously but not necessarily, during the fixing step, the intermediate compound undergoes a treatment by means of microwaves (in other words, microwave radiations are directed against the intermediate compound).

According to some non-limiting embodiments, the microwave radiations have a power of at least approximately 50 W (in particular, at least approximately 80 W; more in particular, at least approximately 90 W). In some cases, alternatively or additionally, the microwave radiations have a power up to approximately 300 W (in particular, up to approximately 200 W; more in particular, up to approximately 150 W; more in particular, up to approximately 110 W).

According to some non-limiting embodiments, the fixing step (during which the microwaves are supplied) has a duration of at least approximately 20 minutes (in particular, at least approximately 30 minutes; more in particular, at least approximately 40 minutes). In some cases, alternatively or additionally, the fixing step (during which the microwaves are supplied) has a duration up to approximately 80 minutes (in particular, up to approximately 60 minutes; more in particular, up to approximately 50 minutes).

Advantageously but not necessarily, during the fixing step, the intermediate compound is in contact with a second liquid, in particular containing water.

In particular, however, in these cases, the intermediate compound is damp and not embedded in the liquid. More precisely, the second liquid (in particular, water) has a weight ranging from approximately 0.0001% (in particular, from approximately 0.0005%; more in particular, from approximately 0.0008%) to approximately 0.01% (in particular, to approximately 0.005%; more in particular, to approximately 0.002%) relative to the weight of the intermediate compound.

According to some non-limiting embodiments, during the fixing step, the intermediate compound is thermally treated in an oven (traditional).

Advantageously but not necessarily (in these cases), the intermediate compound is treated at a temperature of at least approximately 70° C. (in particular, at least approximately 80° C.; more in particular, at least approximately 100° C.; even more in particular, at least approximately 110° C.). In some cases, alternatively or additionally, the intermediate compound is treated at a temperature up to approximately 160° C. (in particular, up to approximately 150° C.; more in particular, up to approximately 140° C.; even more in particular, up to approximately 130° C.)

Advantageously but not necessarily (in particular, when a traditional oven is used), the intermediate compound is thermally treated (more precisely, according to the temperatures indicated above; in particular, inside the oven) for at least 30 minutes (in particular, at least approximately 60 minutes; more in particular, at least approximately 90 minutes; even more in particular, at least approximately 105 minutes). In some cases, alternatively or additionally, the intermediate compound is thermally treated (more precisely, according to the temperatures indicated above; in particular, inside the oven) up to approximately 12 hours (in particular, up to approximately 8 hours; more in particular, up to approximately 5 hours; even more in particular, up to approximately 3 hours).

Advantageously but not necessarily, the method comprises a first washing step, which is prior to the combination step and during which the hollow fibre membranes are washed with a liquid, in particular containing (consisting of) water (and/or ethanol). In particular, the ethanol has a weight ranging from approximately 50% (more in particular, from approximately 70%;

even more in particular, from approximately 90%) to approximately 150% (more in particular, to approximately 130%; even more in particular, to approximately 110%) of the weight of the water. Alternatively or additionally, the liquid comprises from approximately 30% (in particular, from approximately 40%) to approximately 70% (in particular, to approximately 60%) by weight of ethanol relative to the overall weight of the liquid. Alternatively or additionally, the first liquid comprises from approximately 30% (in particular, from approximately 40%) to approximately 70% (in particular, to approximately 60%) by weight of water relative to the overall weight.

Advantageously but not necessarily, the method comprises a second washing step, during which the treated hollow fibre membranes are washed with a liquid (equal to or different from that of the first washing step), in particular containing (consisting of) water (and/or ethanol).

In particular, the ethanol has a weight ranging from approximately 50% (more in particular, from approximately 70%; even more in particular, from approximately 90%) to approximately 150% (more in particular, to approximately 130%; even more in particular, to approximately 110%) of the weight of the water. Alternatively or additionally, the first liquid comprises from approximately 30% (in particular, from approximately 40%) to approximately 70% (in particular, to approximately 60%) by weight of ethanol relative to the overall weight of the liquid. Alternatively or additionally, the first liquid comprises from approximately 30% (in particular, from approximately 40%) to approximately 70% (in particular, to approximately 60%) by weight of water relative to the overall weight.

According to some non-limiting embodiments, the hollow fibre membranes have a length between approximately 0.1 mm and approximately 50 cm (in particular, between approximately 0.1 mm and approximately 5 mm). In particular, the hollow fibre membranes have a mean length of between approximately 0.1 mm and approximately 50 cm (in particular, between approximately 0.1 mm and approximately 5 mm).

Unless explicitly specified to the contrary, in the present text, the mean length is identified by measuring (for example by means of optical microscope) the length of fifty hollow fibre membranes selected at random. More in general, in the present text the mean measurements are calculated by obtaining the mean of fifty random measurements.

The diameter of the pores is measured by means of SEM. More precisely, the dimension in one direction (taken at random) is measured.

According to some non-limiting embodiments, the pores of the outer surface have a mean diameter ranging from approximately 0.1 μm to approximately 15 μm. In addition or alternatively, the pores of the inner surface have pores with mean diameter ranging from approximately 5 nm to approximately 200 nm.

Unless explicitly specified to the contrary, in the present text, the mean diameter of the pores is measured by means of SEM. More precisely, the calculation of the mean diameter is carried out by measuring the dimension in one single direction (taken at random) of fifty pores (taken at random) and obtaining the mean. In particular, an SEM instrument is used.

In particular, the base material comprises polysulfone and/or polyestersulfone.

Advantageously but not necessarily, the base material is selected from the group consisting of: polysulfone, polyethersulfone (and a combination thereof).

More in particular, the base material comprises (even more in particular, is) polysulfone.

According to some non-limiting embodiments, the inner lumen has a cross section with an area ranging from approximately 5000 μm$^2$ to approximately 200000 μm$^2$.

In particular, the inner lumen has an internal diameter (more in particular, mean) ranging from approximately 100 μm to approximately 400 μm.

Advantageously but not necessarily, the side wall has a thickness from approximately 25 μm to approximately 150 μm.

According to some non-limiting embodiments, the side wall has a porosity with a cut off up to approximately 100 kDalton.

In accordance with a second aspect of the present invention, a treated material is provided comprising (in particular, consisting of) at least a treated hollow fibre membrane having a side wall and an inner lumen, which is delimited by the side wall. The side wall (is porous) comprises (in particular, consists of) a base material and has an outer surface provided with pores having diameter ranging from approximately 0.1 μm to approximately 15 μm and an inner surface provided with pores having diameter ranging from approximately 5 nm to approximately 200 nm.

Advantageously but not necessarily, the treated material is obtained by means of the method according to the first aspect of the present invention.

The base material is selected from the group consisting of: polysulfone, polyethersulfone, derivatives thereof (and a combination thereof).

The treated hollow fibre membrane (in particular, the base material; more in particular, the side wall) is coated at least partially with graphene oxide.

Advantageously but not necessarily, the graphene oxide covers (in a substantially fixed manner) at least approximately 20% (in particular, at least approximately 40%; more in particular, at least approximately 50%; even more in particular, at least approximately 55%) of the outer surface. In some cases, additionally or alternatively, the graphene oxide covers (in a substantially fixed manner) up to approximately 99% (in particular, up to approximately 95%; more in particular up to approximately 90%) of the outer surface.

In particular, it is possible to measure the degree of covering of the graphene by means of XPS (if necessary, in combination with X ray spectroscopy—see example 3 below).

Advantageously but not necessarily, the base material is substantially without graphene oxide inside it (the graphene oxide is on the surface—this can be evaluated by means of X rays). More precisely, the base material has inside it a percentage of graphene oxide lower than approximately 20% (in particular, lower than 10%; more in particular, lower than 5%; even more in particular, lower than 1%) by weight relative to the overall weight of the base material.

According to some non-limiting embodiments, the graphene oxide covers (in a substantially fixed manner) at least part of the inner surface. In particular, the graphene oxide covers (in a substantially fixed manner) approximately at least 20% of the inner surface.

According to some non-limiting embodiments, the hollow fibre membrane has a length between approximately 0.1 mm and approximately 50 cm (in particular, between approximately 0.1 mm and approximately 5 mm).

According to some non-limiting embodiments, the pores of the outer surface have a mean diameter ranging from approximately 0.1 μm to approximately 15 μm. Additionally or alternatively, the pores of the inner surface have mean diameter ranging from approximately 5 nm to approximately 200 nm.

In particular, the base material comprises polysulfone and/or polyestersulfone.

Advantageously but not necessarily, the base material is selected from the group consisting of: polysulfone, polyethersulfone (and a combination thereof).

More in particular, the base material comprises (even more in particular, is) polysulfone.

According to some non-limiting embodiments, the inner lumen has a cross section with an area ranging from approximately 5000 μm$^2$ to approximately 200000 μm$^2$.

In particular, the inner lumen has an inner (more in particular, mean) diameter ranging from approximately 100 μm to approximately 400 μm.

Advantageously but not necessarily, the side wall has a thickness ranging from approximately 25 μm to approximately 150 μm.

According to some non-limiting embodiments, the side wall has a porosity with a cut off up to 100 kDalton.

In accordance with a further aspect of the present invention, a use of the treated material according to the second aspect of the present invention is provided for the removal of at least one organic molecule from a fluid (in particular, a liquid; more in particular, water or an aqueous solution), said use comprising the step of placing the treated material in contact with the fluid.

According to some embodiments, the organic molecule is selected from the group consisting of: caffeine, ofloxacin, benzophenone 3, benzophenone 4, carbamazepine, bisphenol A, rhodamine B, diclofenac (and a combination thereof).

Advantageously but not necessarily, the organic molecule is selected from the group consisting of: caffeine, ofloxacin, rhodamine B, diclofenac (and a combination thereof).

Advantageously but not necessarily, the organic molecule is selected from the group consisting of: caffeine, ofloxacin, diclofenac (and a combination thereof).

Advantageously but not necessarily, the organic molecule is selected from the group consisting of: ofloxacin, diclofenac (and a combination thereof).

According to specific embodiments, the organic molecule is caffeine.

According to specific embodiments, the organic molecule is ofloxacin.

According to specific embodiments, the organic molecule is diclofenac.

Unless explicitly indicated to the contrary, the content of the references (articles, books, patent applications etc.) cited in this text is referred to here in full. In particular the mentioned references are herein incorporated by reference.

Further characteristics of the present invention will become clear from the following description of merely illustrative and non-limiting examples.

Example 1

Treatment of the Substrate by Means of Microwaves

1) Washing of the Polysulfone (PS)

6 g of PS (Medisulfone® by Medica S.P.A. —FIG. 2) and 600 mL of deionized water were placed in a 1 L flask. After 1 h of stirring, the water was replaced and the washing was repeated for a total of 4 cycles.

2) Absorption of Graphene Oxide (GO) on the PS Granules

The washed material, still damp (dry weight 3 g), was placed in a 250 mL flask containing 40 mL of an aqueous solution of GO concentration 3.7 mg/mL (GO content 150 mg) and 40 mL of EtOH.

The solvents were removed by rotavapor with bath set to 50° C.

3) Fixing of the GO on the PS by Means of MW—Microwave Treatment

To set up the work method, various tests were carried out on 100 mg of material, varying the parameters:
duration of the irradiation (t)
power of the irradiation (P)
stirring (yes/no)
quantity of irradiated material
use of small reactor (10 mL) or large reactor (35 mL)
addition of small volumes of water to the sample A stability test was performed on the completed tests, immersing a portion of material in water and evaluating, after brief stirring in Vortex, the entity of the release of GO.

The following were identified as advantageous conditions:

100 mg of material+100 µL of water/small reactor/
medium stirring/$P=100$ W/$t=45$ min With this setting the temperature remains stable at approximately 60° C. for the entire duration of the irradiation.

4) Washing of the Material

Figures 7, 8, 9:
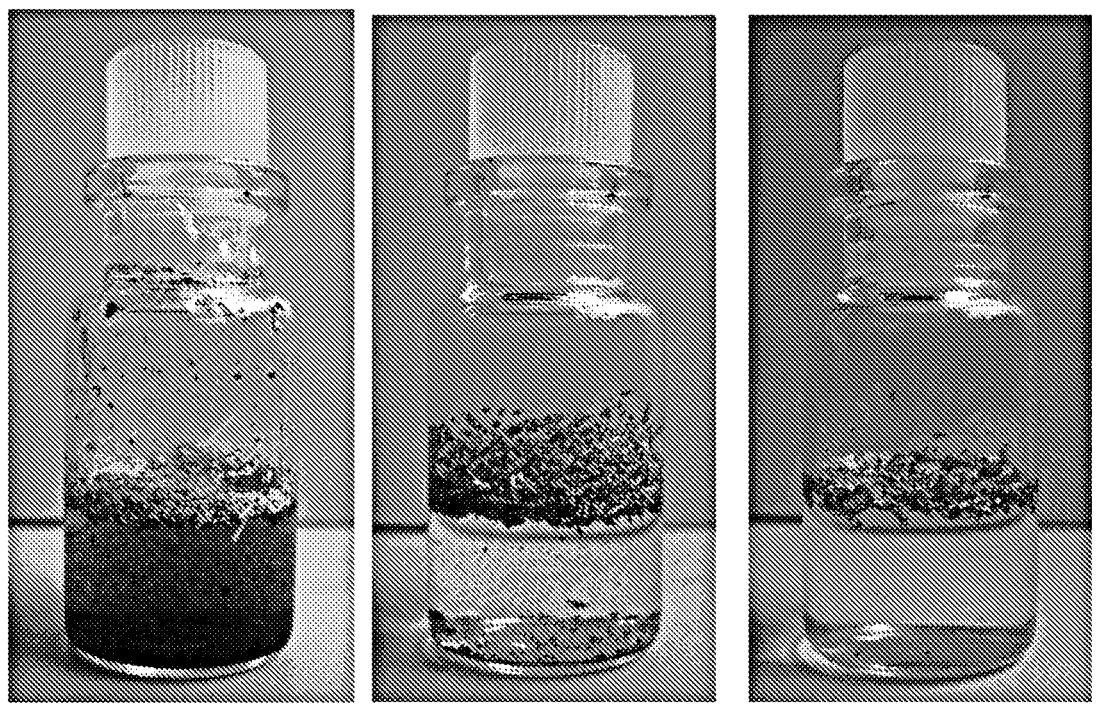
FIGS. 7, 8 and 9 are photographs, respectively, of a substrate and graphene oxide (obtained from combination of the substrate with a solution containing graphene oxide and subsequent removal of the solvent—intermediate compound) in a liquid containing water, of the material treated in accordance with the present invention in a liquid containing water and of the material treated in accordance with the present invention, after being washed.

The material obtained (shown in FIG. 8 in water prior to the washing) and reunited was washed first in water, then in $H_2O$/EtOH 1:1 to remove the reduced GO not fixed on the PS (FIG. 9 shows the material after washing). The material obtained was left to dry in an oven at 40° C. until obtaining constant weight.

Figure 1:
FIG. 1 is a photograph of a treated material (treated hollow fibre) in accordance with the present invention.
Figure 3:
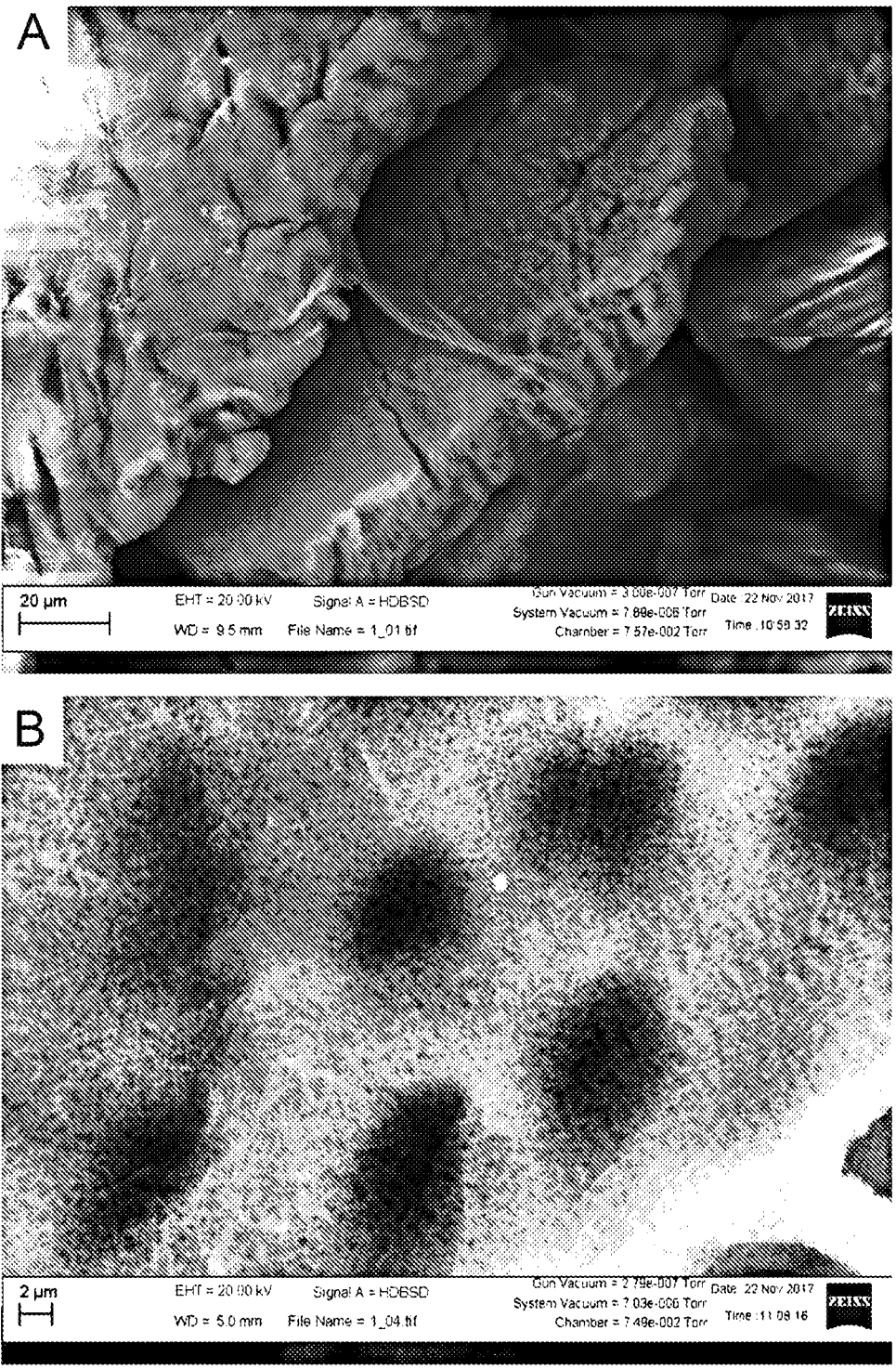
FIG. 3 shows SEM (scanning electron microscope) images of the treated material of FIG. 1.

The material obtained was photographed (FIG. 1) and the SEM images at different levels of enlargement were acquired (FIG. 3).

Figure 10:
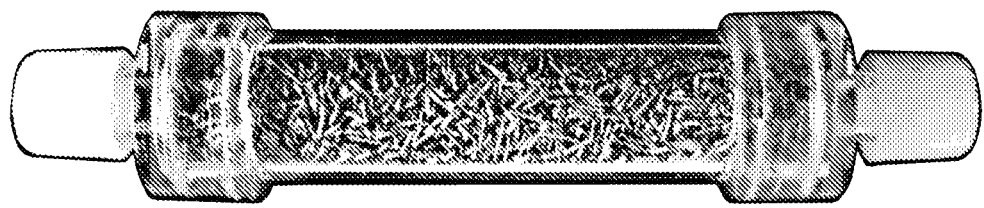
FIG. 10 is a photograph of a cartridge filter containing the treated material as per FIG. 1.
Figure 11:
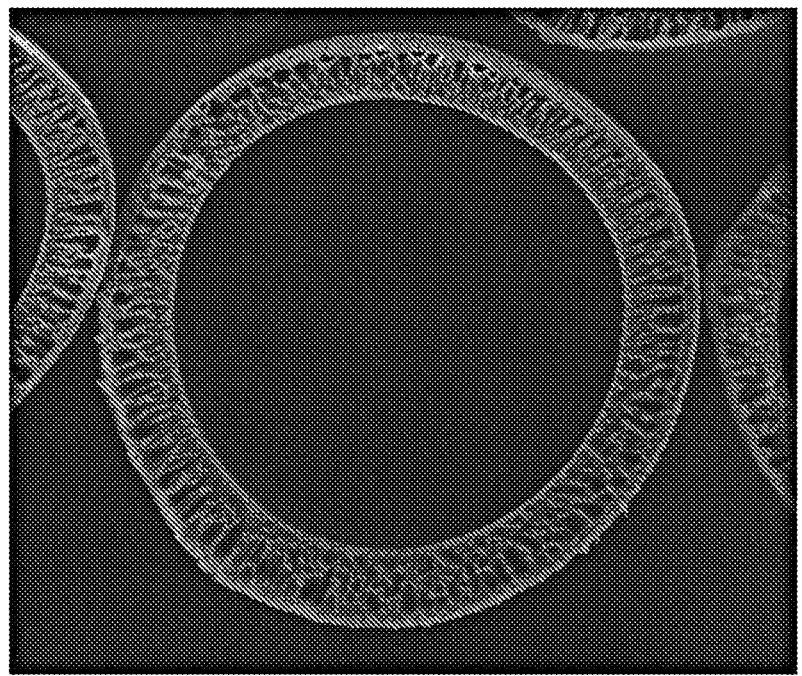
FIG. 11 shows an SEM image of a cross section of the material of FIG. 2.

FIG. 10 shows the prototype of a filter produced with the material obtained using the procedure described in this example.

Example 2

Treatment of the Substrate in an Oven

1) PS Washing (Same Procedure as Example 1)

8 g of GK5 and 600 mL of deionized water were placed in a 1 L flask. After 1 h of stirring the water was replaced and the washing was repeated for a total of four cycles.

2) GO Absorption on PS Granules (Same Procedure as MW—Example 1)

The washed material, still damp (dry weight 4 g), was placed in a 250 mL flask containing 50 mL of an aqueous solution of GO with concentration 4 mg/mL (GO content 200 mg) and 50 mL of EtOH. The solvents were removed by rotavapor with bath set to 50° C.

3) Fixing of the GO on the PS by Treatment in a Fan Oven

To set up the work method, various tests were performed on 100 mg of material:
2 h/80° C.
8 h/80° C.
2 h/100° C.
8 h/100° C.
2 h/120° C.

The conditions described were used on the dry material and on the material saturated with EtOH.

A stability test was performed on each test, immersing a portion of material in water and evaluating, after brief stirring in Vortex, the entity of the release of GO.

The tests lasting 2 h at 120° C. starting from the dry material provided particularly good results and were used for the analyses and the tests reported below.

4) Washing of the Material

The reunited GK5-GO was washed using a rotating stir plate for 2 hours first in water, then in $H_2O$/EtOH 1:1 to remove the reduced GO not fixed on the PS. The material obtained was left to dry in an oven at 40° C. until obtaining a constant weight.

Example 3

Analysis by Means of XPS

The materials obtained following the previous examples (example 1: PS-GO/mw; example 2: PS-GO/o) were analysed by means of X-ray photoelectron spectroscopy (XPS) and the results obtained were compared with analogous analyses carried out on the starting material (pure polysulfone—PS) and the graphite oxide (GO).

The analyses of the samples of PS-GO/o and PS-GO/mw were carried out on the peak of the C is quantifying the presence of GO on PS based on the linear combination of the spectra of the PS and GO taken individually. From the X-ray diffraction measurements, the thickness of the covering is approximately 10 nm, therefore greater than the XPS survey depth (3 nm). It can therefore be assumed that the signal coming from GO corresponds approximately to the surface covering of the GO.

Figure 4:
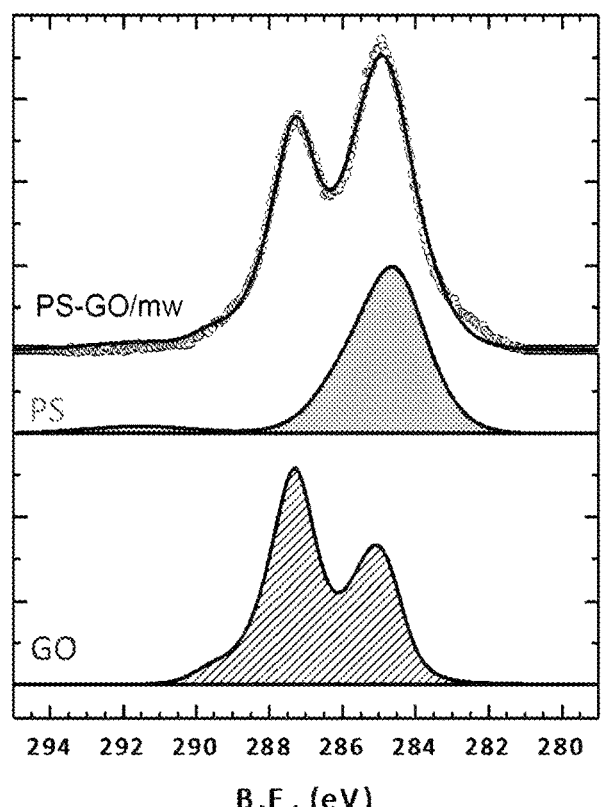
FIG. 4 illustrates XPS (X-ray photoelectron spectroscopy) spectra of the treated material of FIG. 1, of a substrate (non-treated hollow fibres of polysulfone—intermediate spectrum) and of graphene oxide (lower spectrum); the X axis shows the electronvolts, and the Y axis shows arbitrary units.
Figure 5:
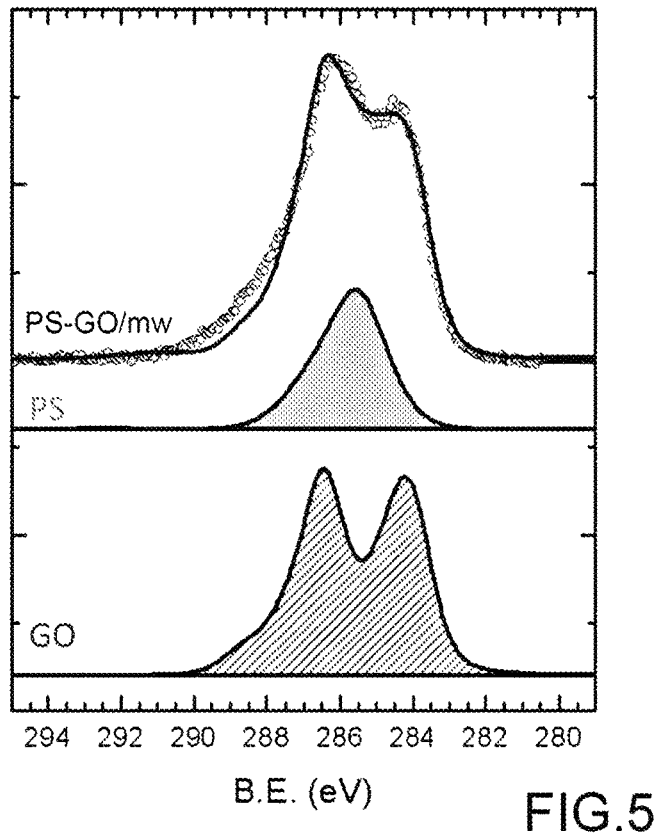
FIG. 5 illustrates XPS (X-ray photoelectron spectroscopy) spectra of a further treated material in accordance with the present invention, of a substrate (non-treated hollow fibres of polysulfone-intermediate spectrum) and of graphene oxide (lower spectrum); the X axis shows the electronvolts, the Y axis shows the arbitrary units.

From the comparisons made it emerged that the microwave-treated material (PS-GO/mw—FIG. 4) had a GO surface covering of 60% (in other words, 60% of its surface area was covered by graphite oxide) and the oven-treated material (at 120° for 2 h) had (PS-GO/o—FIG. 5) a GO surface covering of 69% (in other words, 69% of its surface area was covered by graphite oxide) via XPS (X-ray photoelectron spectroscopy) analysis. In particular, from the XPS emission intensity at carbon binding energies corresponding to the epoxy groups, approximately 287 eV associable uniquely with the GO, it emerged that the microwave-treated material (PS-GO/mw) and the oven-treated material (120° for 1 h) had a GO surface covering higher than 50% (in other words, more than 50% of their surface area was covered by GO).

Example 4

Rhodamine B Removal Kinetics 50 mg of material (PS in one case and PS-GO/mw obtained in accordance with example 2 in the second case) were placed in 3 ml of an aqueous solution of Rhodamine B (RhB) with concentration 2.5 mg/L and then stirred in a rotary stirrer (30 rpm).

Figure 12:
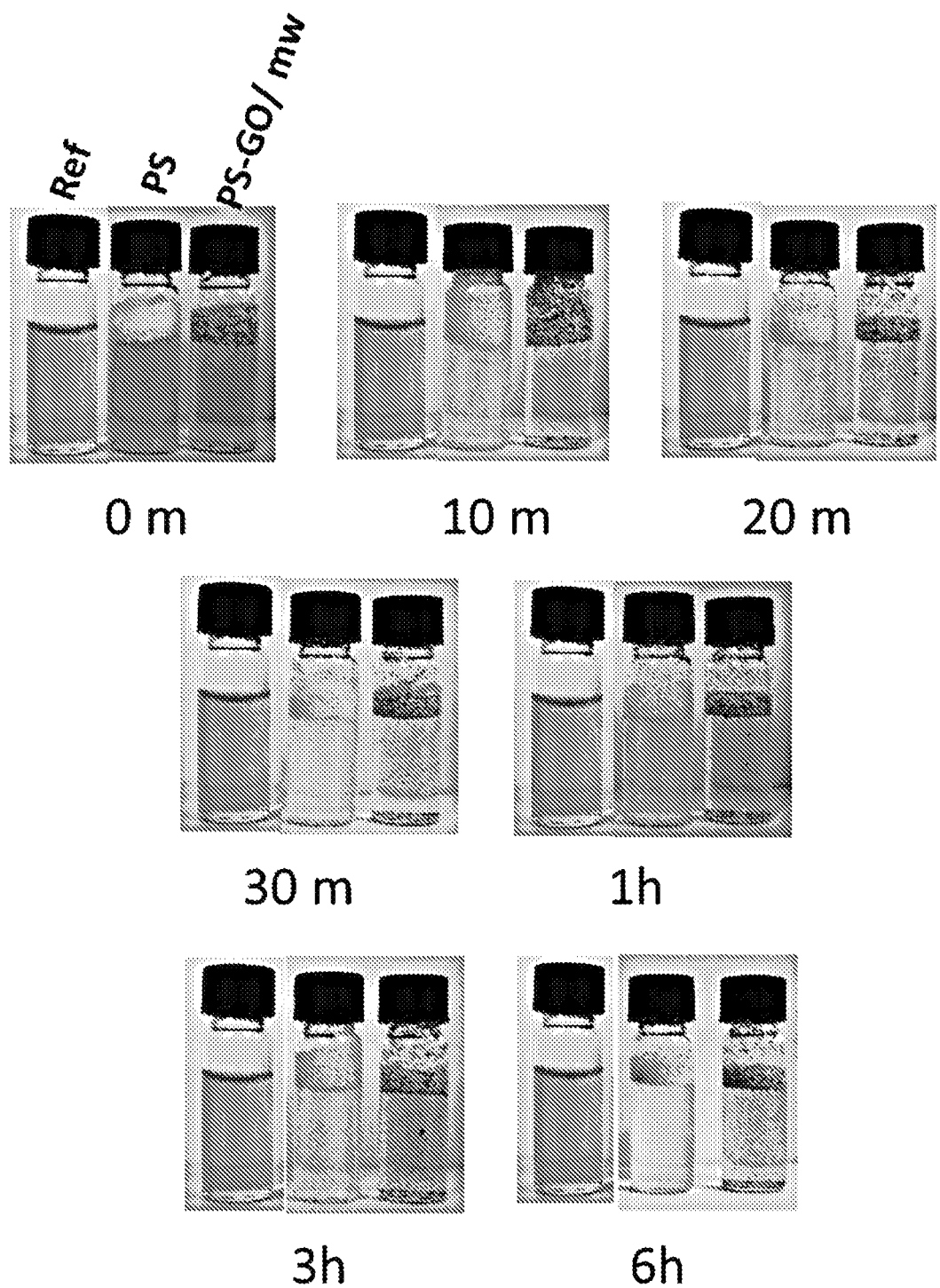
FIG. 12 illustrates photographs of adsorption tests of Rhodamine B for the treated material of FIG. 1 (PS-GO/mw); of a substrate (PS—non-treated hollow fibres of polysulfone) and of a reference (Ref—containing only a solution of Rhodamine B)

FIG. 12 shows the long-term discoloration due to removal of the rhodamine from the solution by the material compared to a reference sample (Ref) which shows the original colour of the non-treated solution.

The detections were carried out: immediately after insertion of the material (o m), after 10 minutes (10 m), after 20 minutes (20 m), after 30 minutes (30 m), after one hour (1 h), after 3 hours (3 h) and after 6 hours (6 h).

The figure shows how after 30 minutes the discoloration due to removal of the rhodamine is complete for the PS-GO/mw, whereas the same result is achieved for the PS only after 6 h.

As can be noted, the absorption speed shown by the material in accordance with the present invention (PS-GO/mw) is significantly and surprisingly higher than that of the non-treated material.

Example 5

Efficiency of Removal of Molecules from Fluid 50 mg of adsorbent material (PS, PS-GO/O and PS-GO/mw) were placed in contact with 25 ml of aqueous solution containing the analytes (CAF, OFLOX, Rh and DCF; namely: caffeine, ofloxacin, rhodamine B and diclofenac, respectively) at a concentration of 5 mg/L each. The solution was stirred for 24 h, then analysed by HPLC with chromatographic column C-8 (Agilent XDB-C8, 4.6 mm×150 mm) using the gradient reported in table 1. Each compound was quantified by comparison between the area below the peak at the wavelength indicated in table 2 for each component and the area of the corresponding peak in the starting mixture.

Repeated injections indicate area values that differ by less than 1%. The detectability limit was estimated approximately 50 µg/L for each component.

TABLE 1

| Time (Min) | A % | B % |
|---|---|---|
| 0 | 80 | 20 |
| 4 | 0 | 100 |
| 7 | 0 | 100 |
| 8 | 80 | 100 |

(A) Milli-Q Water/0.05% Trifluoroacetic Acid

TABLE 2

| Compound | RT (min) | Absorbance $\lambda_{max}$ (nm) |
|---|---|---|
| CAF | 2.412 | 273 |
| OFLOX | 2.706 | 296 |
| Rh | 4.708 | 540 |
| DCF | 4.806 | 278 |

Figure 6:
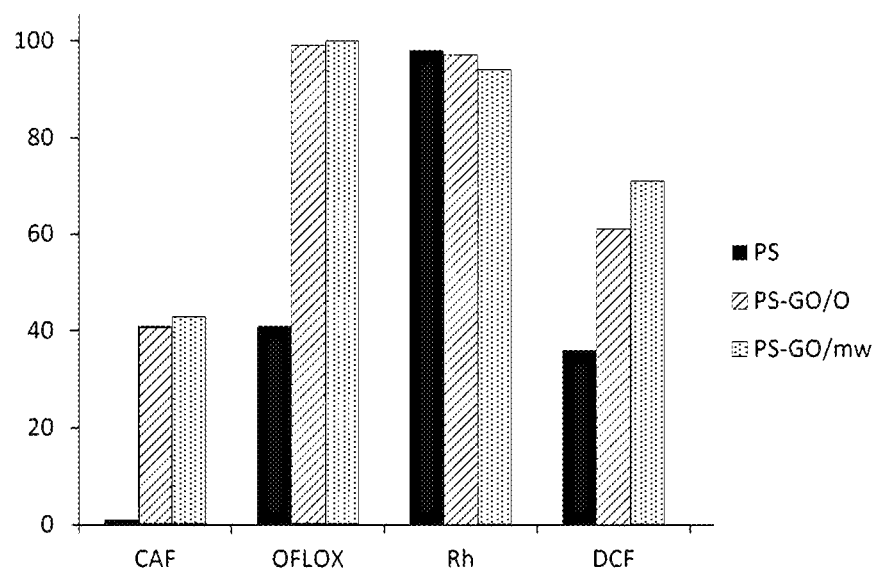
FIG. 6 illustrates the removal percentage, measured following experimental tests, of some organic molecules for a substrate (non-treated—PS), for the treated material of FIG. 1, which has been obtained in accordance with a first method (using a microwave oven—PS-GO/mw), and for a treated material in accordance with a second method (using a traditional oven—PS-GO/O); the Y axis shows the adsorption percentages and the X axis shows the different organic molecules (CAF: Caffeine; OFLOX: Ofloxacin; Rh: Rhodamine B; DCF: Diclofenac)

The histogram of FIG. 6 (together with the respective data of table 3) shows the removal percentages of selected organic molecules from water for PS, PS-GO/O and PS-GO/mw after 24 h of contact.

TABLE 3

|  | CAF | OFLOX | Rh | DCF |
|---|---|---|---|---|
| PS | 1 | 41 | 98 | 36 |
| PS-GO/O | 41 | 99 | 97 | 61 |
| PS-GO/mw | 43 | 100 | 94 | 71 |

The materials in accordance with the present invention have surprisingly and significantly better absorption capacities at least for CAF, OFLOX and DCF. The microwave-treated material (PS-GO/mw) proved to be better than the material treated in a traditional oven (PS-GO/O).

Example 6

Surface Area and Absorption Isotherms

The surface area of the dry powder was measured by means of the absorption of nitrogen ($N_2$) in controlled pressure conditions and according to the ASTM D6556-10 procedure.

The absorption curve as a function of the pressure (isotherm) obtained was analysed by applying the BET model and the surface area of the powder was calculated in $m^2/g$.

Analogously to the procedure for measuring the surface area of the dry powder (ASTM D6556-10), the absorption isotherm for the powder in aqueous solution of Ofloxacin and Rhodamine B was measured. The isotherm was obtained by varying the concentrations of the molecules and evaluating the quantity of molecules absorbed once the equilibrium had been reached (analogously to measurement of the removal efficiency). The BET model described the data of the isotherm and enabled the quantity of molecules adsorbed as a single layer to be obtained, called maximum adsorption capacity, Qm in mg/g, a quantity near to the maximum quantity of molecules that can be absorbed by the surface.

The results obtained are indicated in table 4 below.

Figure 13:
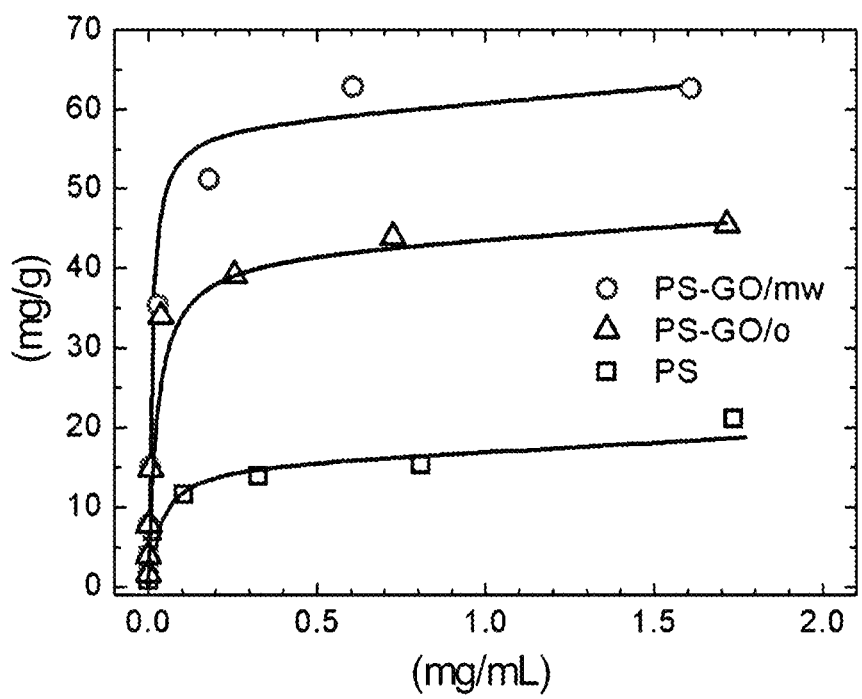
FIG. 13 is an isothermal graph experimentally obtained from adsorption tests of the treated material of FIG. 1 with Rhodamine B; the Y axis shows the quantity of Rhodamine B absorbed per gram of adsorbent, the X axis shows the initial concentration of Rhodamine B.
Figure 14:
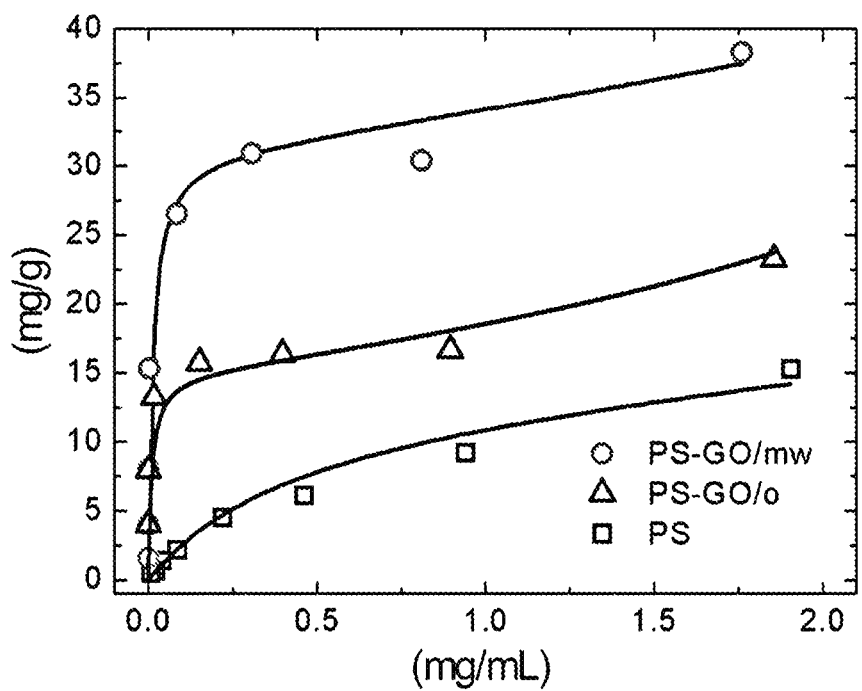
FIG. 14 is an isothermal graph experimentally obtained from adsorption tests of the treated material of FIG. 1 with Ofloxacin; the Y axis shows the quantity of Ofloxacin absorbed per gram of adsorbent, the X axis shows the initial concentration of Ofloxacin.

FIG. 13 shows the absorption isotherms of the rhodamine B for PS, PS-GO/mw and PS-GO/O.

TABLE 4

| Substrate | $N_2$ ($m^2/g$) | Rhodamine B (mg/g) | Ofloxacin (mg/g) |
|---|---|---|---|
| PS | 25.7 ± 0.8 | 21 ± 2 | 9 ± 1 |
| PS-GO/mw | 23.6 ± 0.8 | 60 ± 4 | 31 ± 2 |
| PS-GO/O | (24.0 ± 0.8) | 42 ± 3 | 15 ± 1 |

Surprisingly, although the surface area measured through absorption by dry powder is not affected by the presence of GO, the capacity to absorb molecules increases (for PS-GO/mw aND PS-GO/o) up to a factor of 3.

Example 7

Comparison Between the Material Obtained Following the Procedure of Example 1 and an Only Partially Treated Material The material obtained according to the description following steps 1-3 of example 1 (namely, the washing, absorption and fixing steps) was compared with the material obtained following steps 1 and 2 of example 1 (namely, the washing and absorption steps without the fixing step).

As can be seen by comparing FIG. 7 (relative to the material obtained following steps 1 and 2 of example 1 placed in water) and 8 (relative to the material obtained following steps 1, 2 and 3 of example 1 placed in water), the material treated also by means of fixing releases a much lower quantity of graphene oxide in water than the material treated only by means of the combination step (namely mixing and partial elimination of the first liquid). More precisely, the treated material substantially does not release graphene oxide in water. In this regard, it should be noted that it was not possible to detect release of graphene oxide by UV spectroscopy of the contact waters (which has a sensitivity limit of 2 ppm).

From the above, it is deduced that the fixing treatment by means of heating or by means of microwaves surprisingly allows binding of the graphene oxide to the substrate in a (relatively) stable manner.

It should be noted that the method that results in production of the material illustrated in FIG. 7 is substantially analogous to that of the patent application WO2018/183609.

The invention claimed is:

1. A method for the treatment of a substrate; the substrate includes hollow fibre membranes, each of which includes a side wall, including a base material, and an inner lumen, which is delimited by the side wall; the side wall has an outer surface provided with pores having a diameter in a range from approximately 0.1 μm to approximately 15 μm and an inner surface provided with pores with a diameter in a range from approximately 5 nm to approximately 200 nm; the base material is selected from the group consisting of polysulfone, polyethersulfone, derivatives thereof, and combinations thereof;
the method comprising:
a combination step, during which the substrate is combined with graphene oxide so as to obtain an intermediate compound; during the combination step, the substrate and the graphene oxide are combined with each another inside a first liquid;
a removal step, which is at least partially subsequent to the combination step and during which at least part of the first liquid is removed from the intermediate compound; and
a fixing step, during which the intermediate compound is thermally treated so that the graphene oxide is at least partially fixed to the substrate, thus obtaining a treated material comprising treated hollow fibre membranes; the fixing step being at least partially subsequent to the removal step;
wherein during the fixing step, the intermediate compound, which comprises the substrate and the graphene oxide, undergoes a treatment selected from a group consisting of: treatment by microwaves, treatment by heating and a combination thereof; the microwave treatment entails treating the intermediate compound with microwaves having a power of at least approximately 50 W for at least approximately 20 minutes; the treatment by heating entails treating the intermediate compound in an oven having a temperature of at least approximately 80° C. for at least approximately 90 minutes.

2. The method according to claim 1, wherein, during the fixing step, the intermediate compound undergoes the microwave treatment which entails treating the intermediate compound with microwaves having a power of approximately at least 50 W for approximately at least 20 minutes.

3. The method according to claim 1, wherein the microwave treatment entails treating the intermediate compound with microwaves having a power of approximately at least 80 W for approximately at least 30 minutes; the treatment by heating entails treating the intermediate compound in an oven having a temperature of approximately at least 100° C. for approximately at least 90 minutes.

4. The method according to claim 1 wherein, during the removal step, said at least part of the first liquid is removed by evaporation.

5. The method according to claim 1 wherein, during the fixing step, the graphene oxide is at least partially fixed to a surface of the substrate; said side wall has a thickness from approximately 25 μm to approximately 150 μm.

6. The method according to claim 1, wherein the pores of the outer surface have a mean diameter ranging from approximately 0.1 μm to approximately 15 μm; the pores of the inner surface have pores with a mean diameter ranging from approximately 5 nm to approximately 200 nm.

7. The method according to claim 1 wherein, during the fixing step, the intermediate compound is in contact with a second liquid, in particular containing water.

8. The method according to claim 1 wherein, during the fixing step, microwave radiations are directed towards the intermediate compound.

9. The method according to claim 1, wherein the base material is selected from the group consisting of: polysulfone, polyethersulfone, and combinations thereof.

10. The method according to claim 1, wherein the inner lumen has a cross section with an area ranging from approximately 5000 μm$^2$ to approximately 200000 μm$^2$, in particular with a mean inner diameter ranging from approximately 100 μm to approximately 400 μm.

11. The method according to claim 1 wherein, during the combination and fixing steps, the graphene oxide has a weight of at least 0.5% relative to the weight of the hollow fibre membranes; in particular, the graphene oxide has a weight of up to 10% relative to the weight of the hollow fibre membranes.

12. The method according to claim 1, wherein, at the end of the removal step and prior to the fixing step, the intermediate compound has up to approximately 300% by weight relative to the overall weight of the hollow fibre membranes prior to the combination step.

13. The method according to claim 1, the method further comprising a first washing step, which is prior to the combination step and during which the hollow fibre membranes are washed with a third liquid, in particular containing water and/or ethanol.

14. The method according to claim 4, wherein, during the removal step, the intermediate compound is treated at a temperature lower than approximately 55° C.; during the removal step, the intermediate compound is treated at a pressure lower than the atmospheric pressure.

15. The method according to claim 1, wherein, during the fixing step, the intermediate compound undergoes the microwave treatment, which entails treating the intermediate compound with microwaves having a power up to approximately 200 W for up to approximately 80 minutes.

16. The method according to claim 1, wherein, during the fixing step, the intermediate compound undergoes the treatment by heating in the oven having a temperature up to approximately 160° C. for up to approximately 12 hours.

17. A treated material, comprising:
at least one treated hollow fibre membrane having a side wall, which includes a base material, and an inner lumen, which is delimited by the side wall;
wherein the side wall is porous and has an outer surface provided with pores with a diameter ranging from approximately 0.1 μm to approximately 15 μm and an inner surface provided with pores with a diameter ranging from approximately 5 nm to approximately 200 nm;
wherein the base material is selected from the group consisting of polysulfone, polyethersulfone, derivatives thereof, and combinations thereof;
wherein the at least one treated hollow fibre membrane is coated on at least 20% of the outer surface with graphene oxide;
the treated material being obtained by a method for the treatment of a substrate; the substrate includes hollow fibre membranes, the method comprising:
a combination step, during which the substrate is combined with graphene oxide so as to obtain an intermediate compound; during the combination step, the substrate and the graphene oxide are combined with each another inside a first liquid;

a removal step, which is at least partially subsequent to the combination step and during which at least part of the first liquid is removed from the intermediate compound; and a fixing step, during which the intermediate compound is thermally treated so that the graphene oxide is at least partially fixed to the substrate, thus obtaining the treated material comprising the at least one treated hollow fibre membrane; the fixing step being at least partially subsequent to the removal step;

wherein during the fixing step, the intermediate compound, which comprises the substrate and the graphene oxide, undergoes a treatment selected from a group consisting of: treatment by microwaves, treatment by heating and a combination thereof; the microwave treatment entails treating the intermediate compound with microwaves having a power of at least approximately 50 W for at least approximately 20 minutes; the treatment by heating entails treating the intermediate compound in an oven having a temperature of at least approximately 80° C. for at least approximately 90 minutes.

* * * * *